(12) United States Patent
Treado et al.

(10) Patent No.: US 11,525,733 B2
(45) Date of Patent: Dec. 13, 2022

(54) SYSTEMS AND METHODS OF CONFORMAL SPECTRAL LIBRARY TRAINING

(71) Applicant: CHEMIMAGE CORPORATION, Pittsburgh, PA (US)

(72) Inventors: Patrick J. Treado, Pittsburgh, PA (US); Matthew P. Nelson, Harrison City, PA (US); Shawna Tazik, Kansas City, PA (US); Robert C. Schweitzer, Pittsburgh, PA (US)

(73) Assignee: CHEMIMAGE CORPORATION, Pittsburgh, PA (US)

( * ) Notice: Subject to any disclaimer, the term of this patent is extended or adjusted under 35 U.S.C. 154(b) by 0 days.

(21) Appl. No.: 17/379,588

(22) Filed: Jul. 19, 2021

(65) Prior Publication Data

US 2022/0018713 A1    Jan. 20, 2022

Related U.S. Application Data

(60) Provisional application No. 63/053,273, filed on Jul. 17, 2020.

(51) Int. Cl.
*G01J 3/28* (2006.01)
*G01N 21/31* (2006.01)

(52) U.S. Cl.
CPC ........... *G01J 3/2823* (2013.01); *G01N 21/31* (2013.01); *G01J 2003/2826* (2013.01); *G01J 2003/2833* (2013.01); *G01J 2003/2836* (2013.01)

(58) Field of Classification Search
CPC .... G01J 3/28; G01J 3/2823; G01J 2003/2826; G01J 2003/2833; G01J 2003/2836; G01J 3/0224; G01J 3/36; G01J 3/42; G01J 2003/1213; G01J 3/0205; G01N 21/31
See application file for complete search history.

(56) References Cited

U.S. PATENT DOCUMENTS

| | | | |
|---|---|---|---|
| 9,157,800 B2 | 10/2015 | Priore et al. | |
| 9,645,291 B1 | 5/2017 | Sommer et al. | |
| 10,482,361 B2 * | 11/2019 | Yanson | G06K 19/06028 |
| 2010/0056928 A1 | 3/2010 | Zuzak et al. | |
| 2012/0062874 A1 | 3/2012 | Beckstead et al. | |
| 2013/0341509 A1 | 12/2013 | Nelson et al. | |
| 2014/0185864 A1 | 7/2014 | Halper et al. | |
| 2015/0356341 A1 | 12/2015 | Eccles et al. | |
| 2017/0045436 A1 | 2/2017 | Fox et al. | |
| 2018/0045569 A1 | 2/2018 | Nath et al. | |
| 2019/0014245 A1 | 1/2019 | Rhoads et al. | |

FOREIGN PATENT DOCUMENTS

WO    2019023236 A1    1/2019

* cited by examiner

*Primary Examiner* — Abdullahi Nur
(74) *Attorney, Agent, or Firm* — DLA Piper LLP (US)

(57) ABSTRACT

The conformal spectral library training method (CSLTM) of the disclosure allows sets of voltages for an optical filter to be calculated by way of a direct calculation without processing large amounts of spectral information, which significantly increases the speed of processing spectral information.

10 Claims, 11 Drawing Sheets

SYSTEMS AND METHODS OF CONFORMAL SPECTRAL LIBRARY TRAINING

CROSS-REFERENCE TO RELATED APPLICATIONS

This application claims priority to U.S. Provisional Application No. 63/053,273 filed Jul. 17, 2020, which is hereby incorporated by reference in its entirety.

BACKGROUND

In optical systems that assess samples that contain an analyte or set of analytes, dual polarization conformal filters (DPCF) may be employed. In such configurations, a light source emits source photons that interact with a mass of material that contains one or more analytes. As a result of this interaction, photons are emitted from the sample material. The emitted photons are referred to as interacted photons because they have interacted with the sample and any constituent parts.

A dual polarization conformal filter (DPCF) collects the interacted photons. During operation, the DPCF requires the selection of voltages for two or more discrete tuning states, denoted T1, T2, and so forth. In each tuning state, a voltage is applied to each of the several stages of the DPCF. The voltage applied to each stage of the DPCF changes the alignment of liquid crystals within those stages of the DPCF, thereby "tuning" the DPCF and altering the polarization of the light that is permitted to pass through that particular stage. When used in conjunction with other optical elements of the DPCF such as polarizers and birefringent materials, precise filtering and transformation of interacted photons is achieved. The filtered interacted photons are collected by at least one detector, and information output from the detector can be used to generate an image.

Previous methods used to calculate the voltage of the discrete tuning states require that a scene for analysis include both (1) the "target," which is the analyte material of interest and (2) the "background." The background includes the surface that the target resides on and in certain situations may also include confusants, which are other materials. In such previous methods, the DPCF and detectors would collect multiple data sets and compute the voltage states necessary to discriminate the target from the background and any associated confusants. Such data sets would be collected over the entire voltage range that could potentially provide spectral information about the target(s), confusant(s), and background.

While these methods are accurate, collecting spectral information over the entire voltage range that could potentially provide spectral information about the target(s), confusant(s), and background in a scene is time-consuming and results in excessive amounts of spectral information that must be processed, often redundantly between samples. Additionally, such methods often require that the target and the confusants on the background are both present in the collected image for calculations to be successful.

There is a need for an improved method for directly computing the voltage states necessary to discriminate the target from the background in an image that avoids the drawbacks of previous methods. The improved method would also allow for calculation of voltages in tuning states to be performed directly, rather than through an optimization process. Such calculations could be performed without operator knowledge regarding the presence of materials such as confusants.

SUMMARY

The conformal spectral library training method (CSLTM) of the disclosure allows sets of voltages for an optical filter to be calculated by way of a direct calculation.

Embodiment 1: A method of determining voltage values T1 and T2 for a scene profile of a scene comprising: characterizing an optical filter and forming an optical filter database; characterizing the scene profile of the scene and forming a scene profile database; fusing the spectral profiles of at least one target with the spectral profile of an optical filter database, said fusing including; truncating, zero-offsetting, and vector-normalizing the spectral profiles of the target and the optical filter database spectral profiles; comparing by cosine correlation analysis (CCA) each spectral profile of the target with each optical filter database spectral profile to output an array of target CCA values, scaling each target CCA value in the array to a value of 0 to 1; and generating a target fused score from each scaled target CCA value; fusing the spectral profiles of at least one confusant with the spectral profile of an optical filter database, said fusing including: truncating, zero-offsetting, and vector-normalizing the spectral profiles of at least one confusant and the optical filter database spectral profiles; comparing by CCA each spectral profile of at least one confusant with each optical filter database spectral profile to output an array of confusant CCA values; scaling each confusant CCA value in the array to a value of 0 to 1; and generating a confusant fused score from each scaled confusant CCA value; determining T1 and T2 for application to the optical filter for the scene profile, said determining including: computing a differential metric score that is the absolute difference between each scaled target CCA score and each scaled confusant CCA score; selecting voltages T1 and T2 that correspond with the highest 10% of values of differential metric score; and outputting voltage values T1 and T2 as one or more of a value in a computer readable medium or as voltages that are applied to at least one optical filter.

Embodiment 2: The method of embodiment 1, further comprising calculating a full hypercube on the basis of T1 and T2 and at least one basis vector.

Embodiment 3: The method of embodiment 1, wherein characterizing the optical filter and forming an optical filter database comprises: applying a first series of voltages to a first liquid crystal stage of the optical filter, wherein the first series of voltages includes more than one different voltage that causes an optical response from the first liquid crystal stage of the optical filter; applying a second series of voltages to a second liquid crystal stage of the optical filter, wherein the second series of voltages includes more than one different voltage that causes an optical response from the second liquid crystal stage of the optical filter; determining, at a time that at least overlaps the application of the first series of voltages and the second series of voltages, an optical transmittance of light through the optical filter within a pre-selected range of wavelengths of the light; recording, on a computer readable medium, database entries including the first series of voltages, the second series of voltages, and the optical transmittances of light through the optical filter corresponding to the application of the first series of voltages and the second series of voltages, wherein each database entry is a spectral profile of the optical filter; comparing each spectral profile of the optical filter with each other spectral profile of the optical filter to thereby determine those spectral profiles that are most dissimilar to each other; and designating those spectral profiles that are most dissimilar to each other as orthogonal database pairs to form an optical filter database.

Embodiment 4: The method of embodiment 1, wherein characterizing the scene profile of the scene and forming a scene profile database comprises: generating a spectral profile of a background that is present in the scene; recording, on a computer readable medium, the spectral profile of the background that is present in the scene; generating a spectral profile of at least one target that is present in the scene; recording, on a computer readable medium, the spectral profile of the at least one target that is present in the scene; comparing the spectral profile of the at least one target with the spectral profile of the background; recording, in a scene profile database in a computer readable medium, only the spectral profiles of those targets and the background that overlap.

Embodiment 5: A method of characterizing an optical filter and forming an optical filter database comprising: applying a first series of voltages to a first liquid crystal stage of the optical filter, wherein the first series of voltages includes more than one different voltage that causes an optical response from the first liquid crystal stage of the optical filter; applying a second series of voltages to a second liquid crystal stage of the optical filter, wherein the second series of voltages includes more than one different voltage that causes an optical response from the second liquid crystal stage of the optical filter; determining, at a time that at least overlaps the application of the first series of voltages and the second series of voltages, an optical transmittance of light through the optical filter within a pre-selected range of wavelengths of the light; recording, on a computer readable medium, database entries including the first series of voltages, the second series of voltages, and the optical transmittances of light through the optical filter corresponding to the application of the first series of voltages and the second series of voltages, wherein each database entry is a spectral profile of the optical filter; comparing each spectral profile of the optical filter with each other spectral profile of the optical filter to thereby determine those spectral profiles that are most dissimilar to each other; and designating those spectral profiles that are most dissimilar to each other as orthogonal database pairs to form an optical filter database.

Embodiment 6: The method of embodiment 5, wherein comparing each spectral profile of the optical filter with each other spectral profile of the optical filter is performed by cosine correlation analysis (CCA).

Embodiment 7: A method of characterizing a scene profile for a scene and forming a scene profile database comprising: generating a spectral profile of a background that is present in the scene; recording, on a computer readable medium, the spectral profile of the background that is present in the scene; generating a spectral profile of at least one target that is present in the scene; recording, on a computer readable medium, the spectral profile of the at least one target that is present in the scene; comparing the spectral profile of the at least one target with the spectral profile of the background; recording, in a scene profile database in a computer readable medium, only the spectral profiles of those targets and the background that overlap.

Embodiment 8: The method of embodiment 7, wherein the scene further includes at least one confusant.

Embodiment 9: The method of embodiment 8, further comprising: generating a spectral profile of the at least one confusant; comparing the spectral profile of at least one confusant with the spectral profile of the background, and recording, in a scene profile database in a computer readable medium, only the spectral profiles of those confusants and the background that overlap.

Embodiment 10: The method of embodiment 7, wherein each step of comparing is performed by cosine correlation analysis (CCA).

Embodiment 11: An optical analysis device, comprising memory comprising programmed instructions stored thereon and one or more processors configured to execute the stored programmed instructions to: generate the spectral profile of a background that is present in a scene; record, on a computer readable medium, the spectral profile of the background that is present in the scene; generate the spectral profile of at least one target that is present in the scene; compare each spectral profile of the at least one target and the spectral profile of the background; record, in a scene profile database in a computer readable medium, only the spectral profiles of those targets and the background that overlap.

Embodiment 12: The optical analysis device of embodiment 11, wherein the device further: generates a spectral profile for at least one confusant that is present in the scene, compares the spectral profile of at least one confusant with the spectral profile of the background, and records, in a scene profile database in a computer readable medium, only the spectral profiles of those confusants and the background that overlap.

Embodiment 13: The optical analysis device of embodiment 11, wherein each step of comparing is performed by cosine correlation analysis (CCA).

Embodiment 14: An optical analysis device which during operation: characterizes an optical filter and forming an optical filter database; characterizes a scene profile for a scene and forms a scene profile database; fuses the target spectral profiles with the spectral profiles of the optical filter database, said fusing including; truncating, zero-offsetting, and vector-normalizing the target spectral profiles and the optical filter database spectral profiles; comparing by cosine correlation analysis (CCA) each target spectral profile with each optical filter database spectra profile to output an array of target CCA values, scaling each target CCA value in the array to a value of 0 to 1; generating a target fused score from each scaled target CCA value; fuses the confusant spectral profiles with the spectral profiles of the optical filter database, said fusing including; truncating, zero-offsetting, and vector-normalizing the confusant spectral profiles and the optical filter database spectral profiles; comparing by CCA each confusant spectral profile with each optical filter database spectral profile to output an array of confusant CCA values; scaling each confusant CCA value in the array to a value of 0 to 1; generating a confusant fused score from each scaled confusant CCA value; determines T1 and T2 for application to the optical filter for the scene profile, said determining including: computing a differential metric score that is the absolute difference between each scaled target CCA score and each scaled confusant CCA score; selecting voltages T1 and T2 that correspond with the highest 10% of values of differential metric score; and output voltage values T1 and T2 as one or more of a value in a computer readable medium or as voltages that are applied to at least one optical filter.

Embodiment 15: The optical analysis device of embodiment 14, wherein the optical analysis device further calculates a full hypercube on the basis of T1 and T2 and at least any basis vector.

Embodiment 16: A non-transitory machine readable medium having stored thereon instructions for characterizing an optical filter and forming an optical filter database comprising executable code that, when executed by one or more processors, causes the processors to: apply a first series of voltages to a first liquid crystal stage of the optical filter, wherein the first series of voltages includes more than one different voltage that causes an optical response from the first liquid crystal stage of the optical filter; apply a second series of voltages to a second liquid crystal stage of the optical filter, wherein the second series of voltages includes more than one different voltage that causes an optical response from the second liquid crystal stage of the optical filter; determine, at a time that at least overlaps the application of the first series of voltages and the second series of voltages, an optical transmittance of light through the optical filter within a pre-selected range of wavelengths of the light; record, on a machine readable medium, database entries including the first series of voltages, the second series of voltages, and the optical transmittances of light through the optical filter corresponding to the application of the first series of voltages and the second series of voltages, wherein each database entry is a spectral profile of the optical filter; compare each spectral profile of the optical filter with each other spectral profile of the optical filter to thereby determine those spectral profiles that are most dissimilar to each other; and designate those spectral profiles that are most dissimilar to each other as orthogonal database pairs to form an optical filter database.

Embodiment 17: The non-transitory machine readable medium of embodiment 16, wherein comparing each spectral profile of the optical filter with each other spectral profile of the optical filter is performed by cosine correlation analysis (CCA).

Embodiment 18: A non-transitory machine readable medium having stored thereon instructions for characterizing a scene profile for a scene and forming a scene profile database comprising executable code that, when executed by one or more processors, causes the processors to: determine the spectral profile of a background that is present in the scene; record, on a computer readable medium, the spectral profile of a background that is present in the scene; determine the spectral profile of at least one target that is present in the scene; compare each spectral profile of the at least one target and the spectral profile of the background; record, in a scene profile database in a computer readable medium, only the spectral profiles of those targets and the background that overlap.

Embodiment 19: The non-transitory machine readable medium of embodiment 18, wherein the scene further includes at least one confusant.

Embodiment 20: The non-transitory machine readable medium of embodiment 19, wherein the instructions further cause the processors to: generate a spectral profile of the at least one confusant; compare the spectral profile of at least one confusant with the spectral profile of the background, and record, in a scene profile database in a computer readable medium, only the spectral profiles of those confusants and the background that overlap.

Embodiment 21: The non-transitory machine readable medium of embodiment 18, wherein each step of comparing is performed by cosine correlation analysis (CCA).

Embodiment 22: A non-transitory machine readable medium having stored thereon instructions for determining voltage values T1 and T2 for a scene profile of a scene comprising executable code that, when executed by one or more processors, causes the processors to: characterize an optical filter and forming an optical filter database; characterize a scene profile for a scene and forming a scene profile; fuse the target spectral profiles with the spectral profiles of the optical filter database, said fusing including; truncating, zero-offsetting, and vector-normalizing the target spectral profiles and the optical filter database spectral profiles; comparing by cosine correlation analysis (CCA) each target spectral profile with each optical filter database spectra profile to output an array of target CCA values, scaling each target CCA value in the array to a value of 0 to 1; generating a target fused score from each scaled target CCA value; fuse the confusant spectral profiles with the spectral profiles of the optical filter database, said fusing including; truncating, zero-offsetting, and vector-normalizing the confusant spectral profiles and the optical filter database spectral profiles; comparing by CCA each confusant spectral profile with each optical filter database spectral profile to output an array of confusant CCA values; scaling each confusant CCA value in the array to a value of 0 to 1; generating a confusant fused score from each scaled confusant CCA value; determine T1 and T2 for application to the optical filter for the scene profile, said determining including: computing a differential metric score that is the absolute difference between each scaled target CCA score and each scaled confusant CCA score; selecting voltages T1 and T2 that correspond with the highest 10% of values of differential metric score; and output voltage values T1 and T2 as one or more of a value in a computer readable medium or as voltages that are applied to at least one optical filter.

Embodiment 23: The non-transitory machine readable medium of embodiment 22, wherein the executable code further comprises instructions that when executed by one or more processors, cause the processors to calculate a full hypercube on the basis of T1 and T2 and at least one basis vector.

DRAWINGS

Aspects, features, benefits and advantages of the embodiments described herein will be apparent with regard to the following description, appended claims, and accompanying drawings where:

FIGS. 9A-F depict score images in accordance with various embodiments.

Figure 10A:
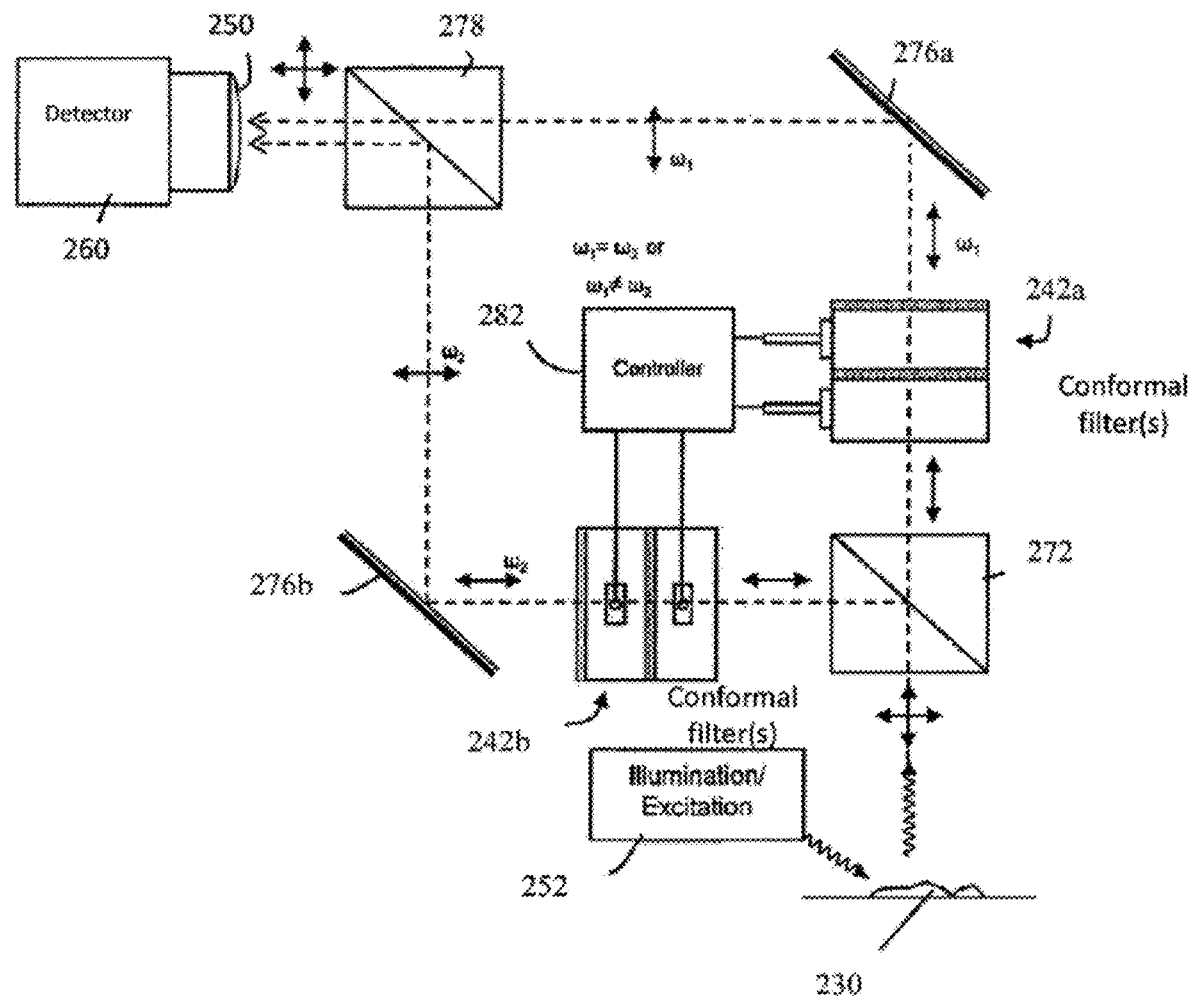

FIG. 10A depicts an apparatus in accordance with a first embodiment.

Figure 10B:
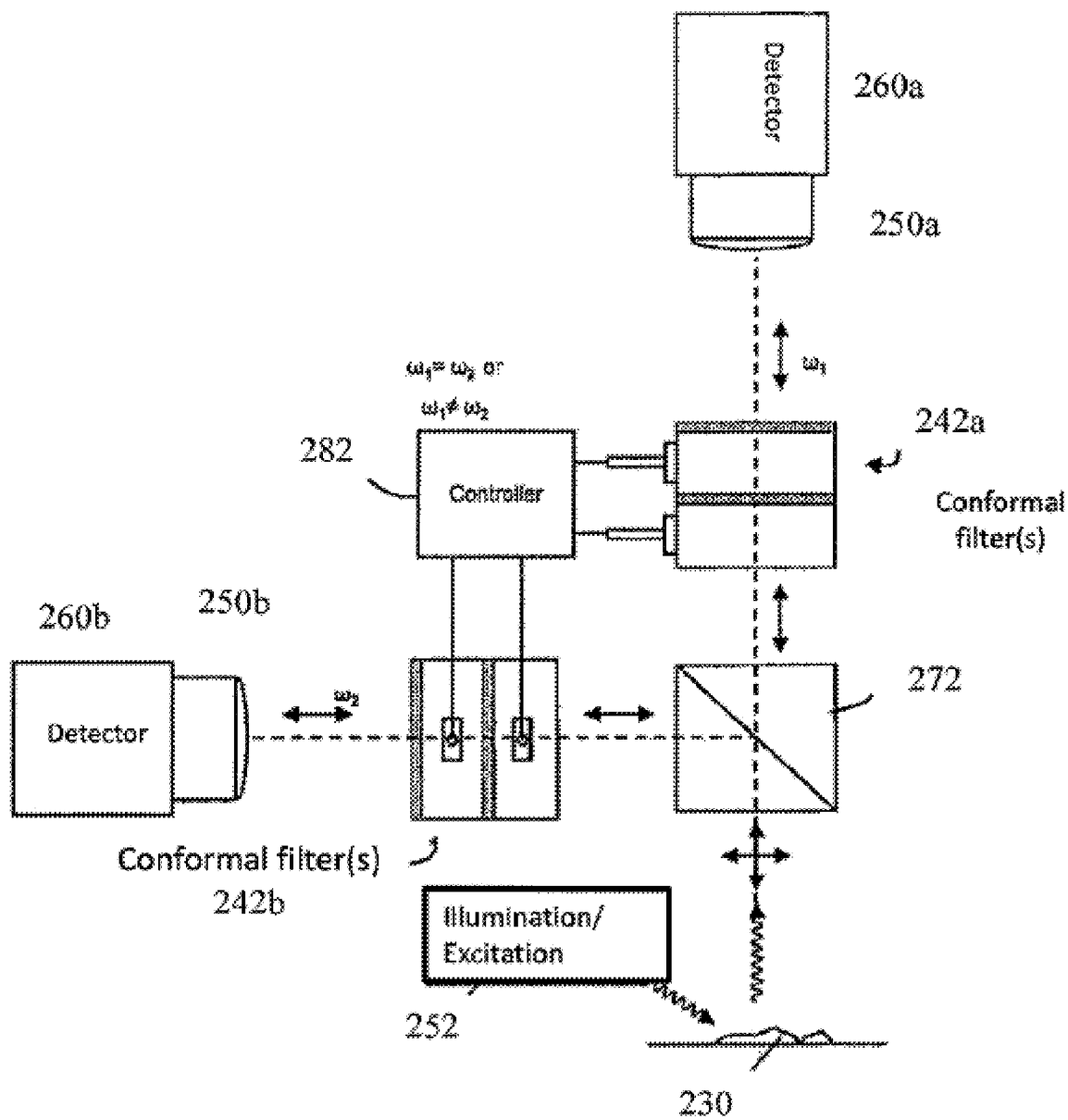

FIG. 10B depicts an apparatus in accordance with a second embodiment.

Figure 11A:

FIG. 11A depicts a scaled score image with correction in accordance with an embodiment.

Figure 11B:
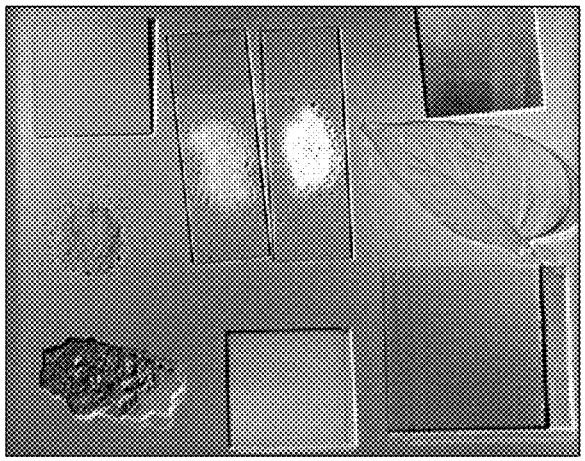

FIG. 11B depicts a scaled score image without correction according to an embodiment.

Figure 11C:
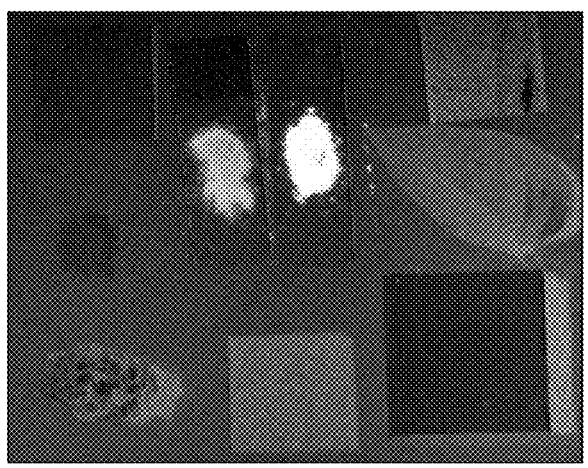

FIG. 11C depicts a scaled score image according to an embodiment.

Figure 11D:
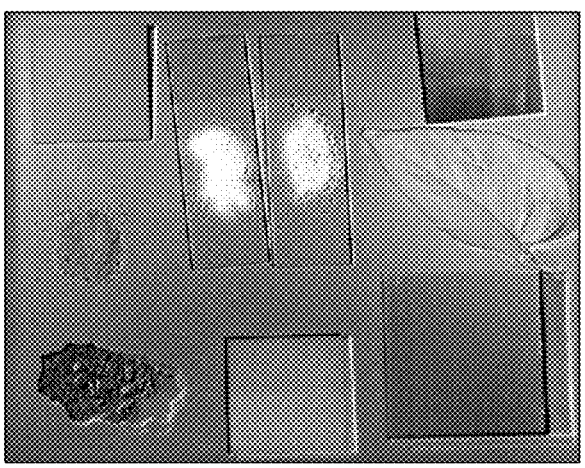

FIG. 11D depicts a scaled score image according to an embodiment.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, "target" means a material that is desired to be identified by the CSLTM or by any system or apparatus that employs the CSLTM. Examples of the target are not limited and include explosive compounds, pharmaceutical compounds, and contraband materials. The target is present on a background and may be accompanied by or associated with one or more confusants.

As used herein, "confusant" means any material that is present on, associated with, or is embedded in a background but that is not the target. Examples of confusants include, but are not limited to, vegetation, dirt, grime, oils, and dust.

As used herein, "background" means a surface or substrate on which, associated with, or in which is embedded one or more targets and, optionally, one or more confusants.

As used herein, "spectral profile" means a quantified intensity of light that is reflected from a background, target, or confusant as measured at each wavelength of light. The number and range of the measured wavelengths are not limited.

As used herein, "scene" means an overall mass of material that includes one or more of each of a background, a confusant, and a target.

Figure 1:
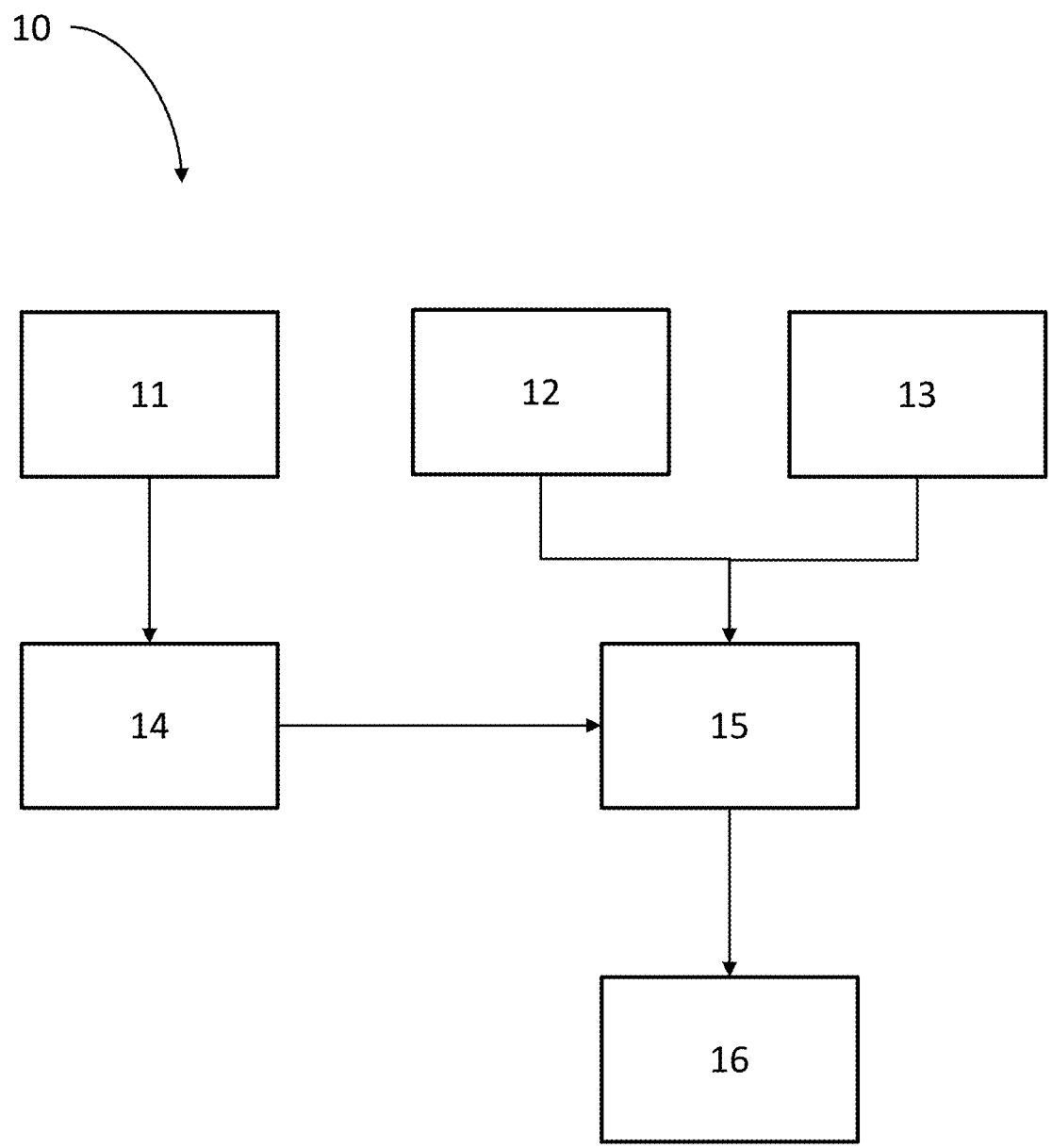
FIG. 1 is a block diagram depicting a method in accordance with one embodiment of the disclosure.

Referring now to FIG. 1, a block diagram describes the conformal spectral library training method 10. The method includes generating 11 unique conformal database spectra. The unique conformal database spectra may be generated 11 by subjecting a particular conformal filter to a pre-determined voltage range with specified voltage intervals while analyzing the spectral throughput of the conformal filter. For example, in one embodiment, a conformal filter is exposed to voltages in the range between about 1.6 V to about 4.6 V with step sizes of about 0.01 V. This results in a total of about 301 discrete voltage samples for each of two filter stages in a DPCF. At each applied voltage, the brightness of light that is transmitted through the conformal filter at each applied voltage is measured to form a spectral profile of light amplitudes versus wavelengths of the light. In the embodiment described above, 90,601 (i.e., 301*301) spectral profiles result from the voltage samples. One of ordinary skill in the art will appreciate that the range and step sizes are not limited and can be modified depending on the desired range of light wavelengths and resolution of the database.

Figure 2:
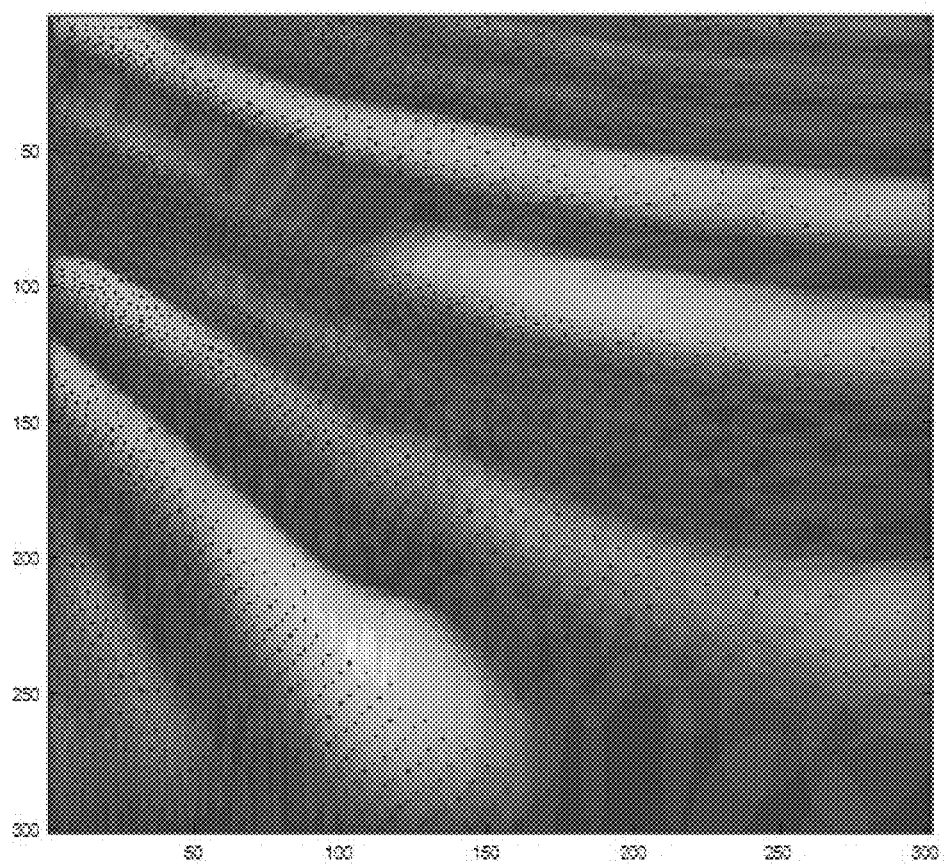
FIG. 2 is an image of unique voltage states and the reoccurrence of duplicate spectral profiles in accordance with an embodiment of the disclosure.

Each spectral profile may be compared to each other spectral profile by cosine correlation analysis (CCA). Again referring to the example above, a CCA of the 90,601 spectral profiles revealed that only 2,118 (2.34%) of the spectral profiles were unique when the minimum CCA threshold was set to 0.99. FIG. 2 represents an image of unique voltage states, where unique spectral profiles are represented by a "0" and duplicate spectral profiles are represented by a count of the number of times that they were tagged as duplicates. As shown in FIG. 2, a value of "0" has a color of black, and a value of "41", which in this example represented the maximum number of duplicates, has a light color appearing in bands across FIG. 2. By identifying the unique conformal database spectral profiles, it is possible to substantially reduce the number of spectral profile comparisons that are made in the CSLTM. The operations represented by block 11 are only performed once by the CSLTM 10 for a particular conformal filter.

Additionally, the CSLTM 10 of FIG. 1 determines orthogonal database pairs in block 14. When determining 14 orthogonal database pairs, each unique database spectral profile that was identified in block 11 is compared with each other database spectral profile via CCA. Pairs of spectral profiles that are the most dissimilar profiles are designated as orthogonal database pairs. Block 14 is only performed once by the CSLTM 10 for a particular conformal filter, and it can be performed in time before or after the steps of block 12 and block 13 of FIG. 1.

Figure 3:
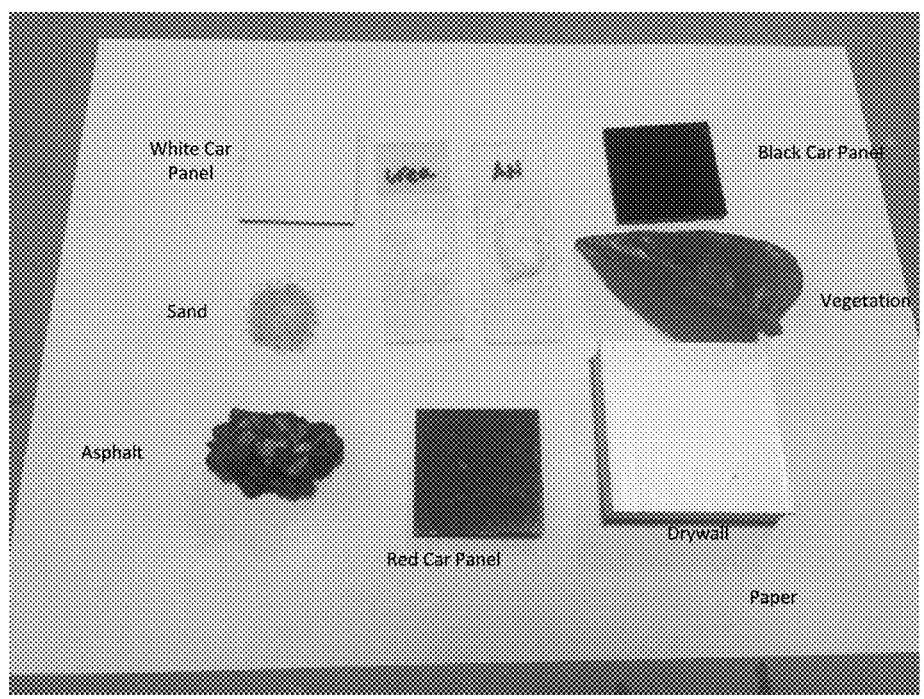
FIG. 3 depicts an example of a scene in accordance with an embodiment of the disclosure.

Referring again to FIG. 1, the CSLTM 10 selects a pre-determined target spectral profile in block 12 and selects a pre-determined background spectral profile in block 13 that corresponds to the presented scene and the desired scene profile. The presented scene is the surface or environment that is being analyzed, and the scene profile is the materials that the user desires to detect. An example of this is shown in FIG. 3, which is a photograph of various materials that simulate an outdoor scene where the user desired to identify explosives. As shown in FIG. 3, the scene includes a white car panel, sand, asphalt, a red car panel, a black car panel, vegetation, and paper, but also the explosives urea (the leftmost clear sample slide) and ammonium nitrate (the rightmost clear sample slide). As described throughout this specification, this particular scene and its corresponding scene profile is not intended to be limiting and other scenes and corresponding scene profiles are contemplated to identify different material in different locations.

Figure 4A:
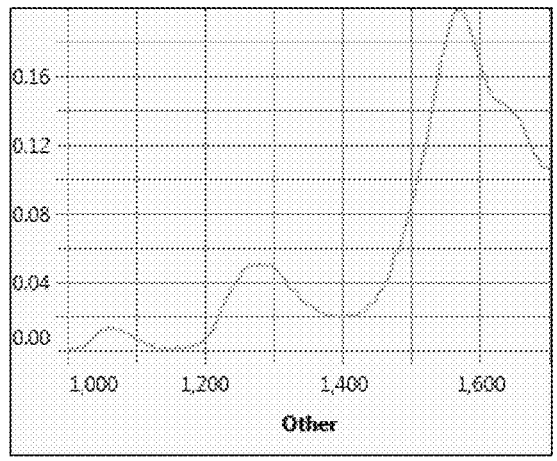
FIG. 4A depicts an absorbent spectral profile of ammonium nitrate.
Figure 4B:
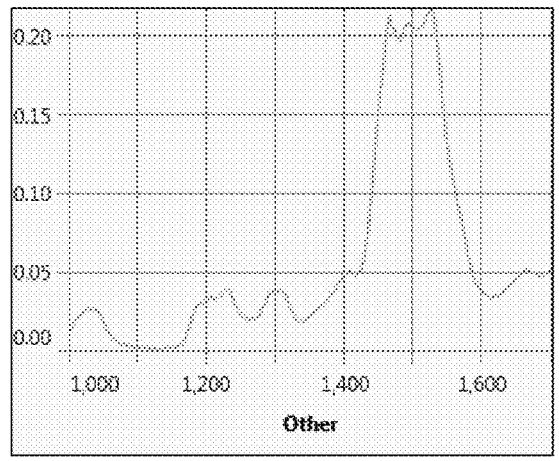
FIG. 4B depicts an absorbent spectral profile of urea.
Figure 4C:
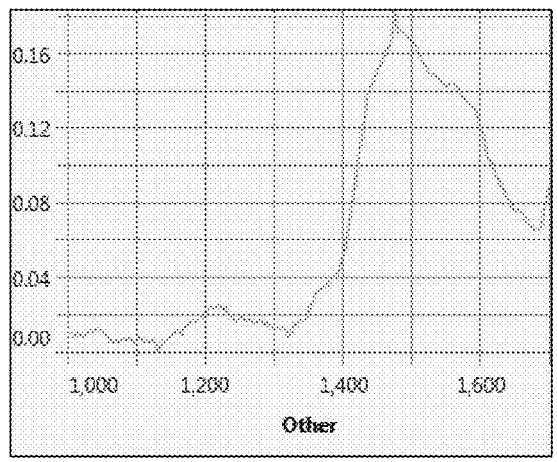
FIG. 4C depicts an absorbent spectral profile of paper.
Figure 4D:
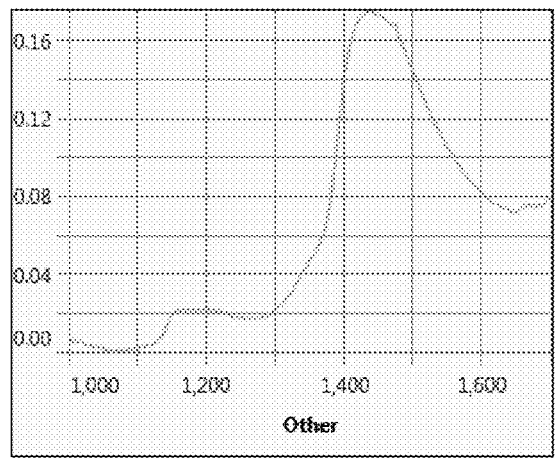
FIG. 4D depicts an absorbent spectral profile of vegetation.
Figure 4E:
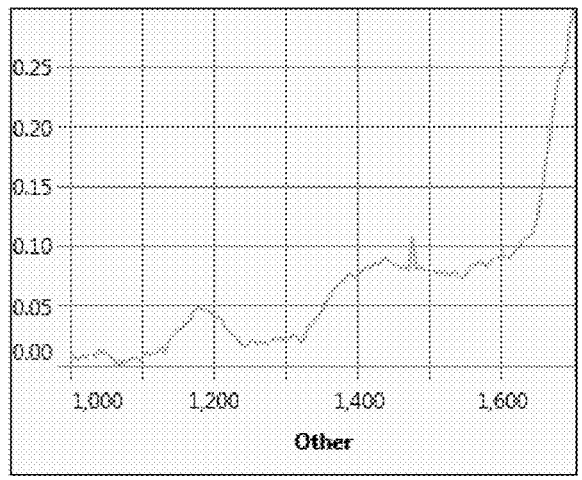
FIG. 4E depicts an absorbent spectral profile of drywall (gypsum wallboard).
Figure 4F:
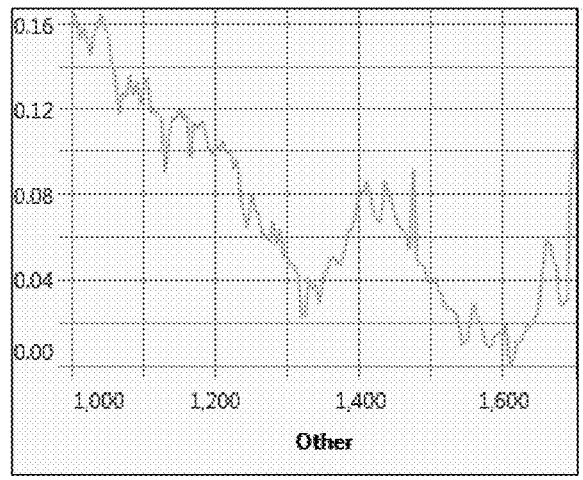
FIG. 4F depicts an absorbent spectral profile of sand (silica).
Figure 4G:
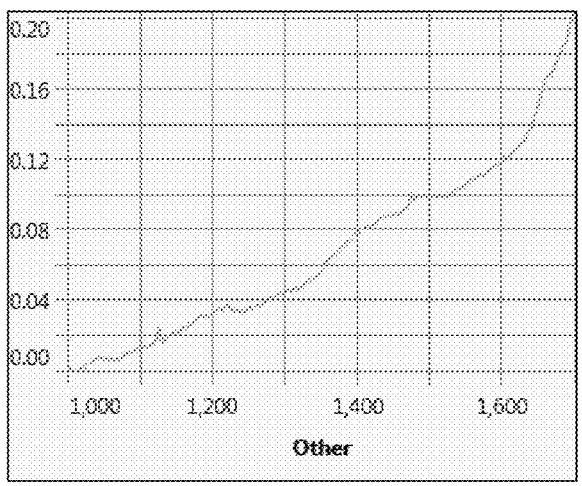
FIG. 4G depicts an absorbent spectral profile of a white painted panel.
Figure 4H:
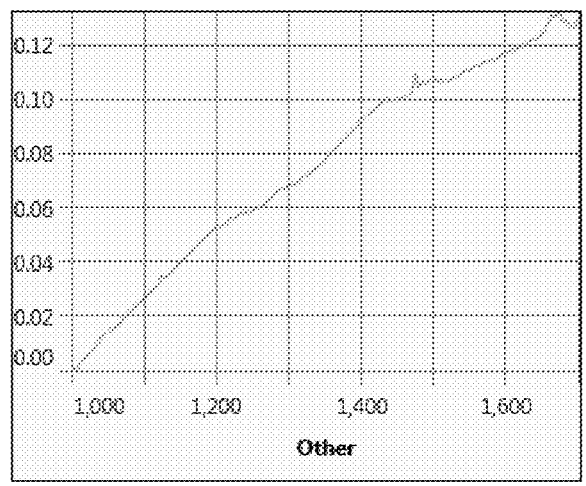
FIG. 4H depicts an absorbent spectral profile of a red painted panel.

FIGS. 4A-4H depict an absorption spectral profile for each of the compounds that is found in the scene of FIG. 3. FIG. 4A depicts the spectral profile of ammonium nitrate, FIG. 4B depicts the spectral profile of urea, FIG. 4C depicts the spectral profile of paper, FIG. 4D depicts the spectral profile of vegetation, FIG. 4E depicts the spectral profile of drywall (gypsum wallboard), FIG. 4F depicts the spectral profile of sand (silica), FIG. 4G depicts the spectral profile of a white painted panel, and FIG. 4H depicts the spectral profile of a red painted panel. In the above example referring to the identification of explosives, only ammonium nitrate (FIG. 4A) and urea (FIG. 4B) serve as target materials. In the context of the background materials and any confusant materials, only confusant materials that are spectrally unique and that overlap significantly with any of the targets must be analyzed when performing the CSLTM techniques. Furthermore, if a plurality of background materials substantially overlap in spectral profile, only one of such background materials may be analyzed. For example, paper and vegetation have substantially similar target spectra. As such, analysis of only one of paper and vegetation may be performed in the CSLTM where both are present in a scene. For a given scene and scene profile, the CSLTM 10 performs each of blocks 12 and 13 only once.

The CSLTM 10 may also include a lookup algorithm 15. The lookup algorithm 15 calculates at least one voltage T1 and at least one voltage T2 that are applied to the DPCF. The at least one voltage T1 and the at least one voltage T2 correspond to the desired targets, background materials, and confusants that are predicted by an operator to reside in a particular scene. In some embodiments, the at least one voltage T1 and the at least one voltage T2 are in vector form, and are depicted as T1/T2 vectors 16 in FIG. 1.

The CSLTM 10 of the disclosure is applicable to many different optical apparatus. One example of such an optical apparatus, which is not limited, is provided by U.S. Pat. No. 9,157,800, which was issued on Oct. 13, 2015 to Priore et al. and is incorporated herein by reference in its entirety. In one embodiment, the optical apparatus includes a single detector. Referring to FIG. 10A, the sample 230 is illuminated and/or excited by an illumination source 252. The illuminating photons are emitted by the illumination source 252 and interact with the sample 230. The sample 230 includes one or more of a background, a target, or a confusant. As a result of being illuminated with the illuminating photons, the sample emits interacted photons, which enter an optical element 272. The optical element 272 includes one or more of a beam splitter, a dichroic mirror, or an optical mirror. The beam splitter may further comprise a polarizing beam splitter or a non-polarizing beam splitter.

In the particular arrangement of FIG. 10A, the optical apparatus includes two separate filters: a first conformal filter 242a and a second conformal filter 242b. A first portion of the interacted photons is directed to the first conformal filter 242a, and a second portion of the interacted photons is directed to the second conformal filter 242b. The respective portions of the interacted photons are filtered and thereby these resultant filtered photons are reflected by mirrors 276a and 276b. The filtered photons have two spectral profiles which are depicted as $\omega_1$ and $\omega_2$. Spectral profiles $\omega_1$ and $\omega_2$ can be the same or different. Each of the first conformal filter 242a and the second conformal filter 242b are independently tunable by controller 282.

The embodiment of FIG. 10A also includes one or more reflectors, such as mirrors 276a and 276b. Light having spectral profiles $\omega_1$ and $\omega_2$ is also combined by optical element 278. Optical element 278 is not limited and may include one or more of a beam combiner, a polarizing cube, or a polarizing beam splitter. For example, light having spectral profiles $\omega_1$ and $\omega_2$ can be combined to enter lens assembly 250 and be directed to detector 260.

In another embodiment, the optical apparatus includes at least a two detectors, which are depicted in FIG. 10B as first detector 260a and second detector 260b. Referring to FIG. 10B, the sample 230 is illuminated and/or excited by an illumination source 252. The illuminating photons are emitted by the illumination source 252 and interact with the sample 230. The sample 230 includes one or more of a background, a target, or a confusant. As a result of being illuminated with the illuminating photons, the sample emits interacted photons. The interacted photons enter optical element 272. Optical element 272 includes one or more of a beam splitter, a dichroic mirror, or an optical mirror. The beam splitter may further comprise a polarizing beam splitter or a non-polarizing beam splitter.

In the particular arrangement of FIG. 10B, the optical apparatus includes two separate filters: a first conformal filter 242a and a second conformal filter 242b. A first portion of the interacted photons is directed to the first conformal filter 242a, and a second portion of the interacted photons is directed to the second conformal filter 242b. The respective portions of the interacted photons are filtered, and the resultant filtered photons are reflected by mirrors 276a and 276b. The filtered photons have two spectral profiles which are depicted as $\omega_1$ and $\omega_2$. Spectral profiles $\omega_1$ and $\omega_2$ can be the same or different. Each of the first conformal filter 242a and the second conformal filter 242b are independently tunable by controller 282. The filtered light having spectral profile $\omega_1$ enters a first lens assembly 250a and is directed to a first detector 260a. The filtered light having spectral profile $\omega_2$ enters a second lens assembly 250b and is directed to a second detector 260b.

In some embodiments, the illumination source may include, without limitation, an incandescent lamp, a halogen lamp, a light emitting diode (LED), a quantum cascade laser, a quantum dot laser, an external cavity laser, a chemical laser, a solid state laser, an organic light emitting diode (OLED), an electroluminescent device, a fluorescent light, a gas discharge lamp, a metal halide lamp, a xenon arc lamp, an induction lamp, or any combination thereof. In some embodiments, the illumination source is a tunable illumination source, which means that the illumination source is monochromatic and can be selected to be within a desired wavelength range. The selected wavelength range of the tunable illumination source is not limited and can be any passband within the ultraviolet (UV), visible (VIS), near infrared (NIR), visible-near infrared (VIS-NIR), shortwave infrared (SWIR), extended shortwave infrared (eSWIR), and near infrared-extended shortwave infrared (NIR-eSWIR) ranges. These classifications correspond to wavelengths of about 180 nm to about 380 nm (UV), about 380 nm to about 720 nm (VIS), about 400 nm to about 1100 nm (VIS-NIR), about 850 nm to about 1800 nm (SWIR), about 1200 nm to about 2450 nm (eSWIR), and about 720 nm to about 2500 nm (NIR-eSWIR). A selected wavelength range may correspond to a combination of one or more of the above-listed wavelength ranges. Such a combination of wavelength ranges may include adjacent (contiguous) ranges, overlapping ranges, and ranges that do not overlap.

Referring back to the embodiment of FIG. 10A, the detector 260 may comprise one or more detectors including, but not limited to, at least one of a CCD detector or a CMOS detector. In some embodiments, the detector 260 may include one or more detectors made of silicon (Si), germanium (Ge), indium gallium arsenide (InGaAs), platinum silicide (PtSi), mercury cadmium telluride (HgCdTe), indium antimonide (InSb), and/or colloidal quantum dots (CQD).

In some embodiments, the detector 260 is characterized by the wavelengths of light that it is capable of imaging. The wavelengths of light that can be imaged by the detector 260 are not limited and may include ultraviolet (UV), visible (VIS), near infrared (NIR), visible-near infrared (VIS-NIR), shortwave infrared (SWIR), extended shortwave infrared (eSWIR), and near infrared-extended shortwave infrared (NIR-eSWIR), which correspond to the wavelength ranges identified above. One or more of the wavelength ranges may be used alone or in combination with any other wavelength range. Such combinations may include adjacent (contiguous) ranges, overlapping ranges, and ranges that do not overlap. The combination of ranges may be achieved by the inclusion of multiple detectors, where each detector is sensitive to a particular range, or a detector chip that can sense multiple wavelength ranges, such as by the inclusion of a color filter array.

In some embodiments, the method of conformal spectral library training is performed within or in association with the optical apparatus that includes one or more processors and at least one memory. The one or more processors of the optical apparatus may execute programmed instructions stored in the memory for any number of the functions described and illustrated herein. The one or more processors of the optical apparatus may include one or more CPUs or general purpose processors with one or more processing cores although other types of processors can also be used.

The memory of the optical apparatus stores these programmed instructions for one or more aspects of the present technology as described and illustrated herein, although some or all of the programmed instructions could be stored elsewhere. Any of a variety of memory storage devices may be used. For example a memory storage device may include random access memory (RAM), read only memory (ROM), a hard disk, a solid state drive, flash memory, or any other tangible computer readable medium. The memory storage device may be read from and written to by a magnetic, optical, or other reading and writing system. The memory storage device may be coupled to the one or more processors. In still further embodiments, the memory storage device may be separate from the optical apparatus. In some embodiments, the memory storage device may be part of a computer program product that causes the execution of the methods described herein.

Accordingly, the memory storage device of the optical apparatus can store one or more applications including executable instructions that, when executed by the one or more processors, cause the optical apparatus to perform actions, such as to perform the actions described and illustrated herein with reference to FIG. 1. In some embodiments, the one or more applications can be implemented as modules or components of one or more other applications. In some embodiments, the one or more applications can be implemented as operating system extensions, modules, plugins, or the like.

In some embodiments, the one or more applications may be operative in a cloud-based computing environment. In some embodiments, the one or more applications can be executed within or as one or more virtual machines or one or more virtual servers that may be managed in a cloud-based computing environment. In some embodiments, the one or more applications and/or the optical apparatus may be located in one or more virtual servers running in a cloud-based computing environment rather than being tied to one or more specific physical network computing devices. In some embodiments, the one or more applications may run in one or more virtual machines (VMs) executing on the optical apparatus. Additionally, in one or more embodiments of this technology, one or more virtual machines running on the optical apparatus may be managed or supervised by a hypervisor.

Additional Conformal States

In some embodiments, the selection of only two conformal states may be insufficient to discriminate a group of targets from a group of confusants. In one such embodiment, the target spectral profiles that correspond to the targets in the group may be substantially dissimilar from each other. In such an embodiment, the CSLTM may be modified by separating the target spectral profiles into more than one subgroup so that each subgroup of target spectral profiles are similar. In another such embodiment, the confusant spectral profiles that correspond to the confusants in the group may be substantially dissimilar from each other. In this embodiment, the CSLTM may be modified by separating the confusant spectral profiles into more than one subgroup so that each subgroup of confusant spectral profiles are similar.

In some embodiments, one or more target spectral profiles may be substantially similar to one or more confusant spectral profiles. In such embodiments, a hierarchical approach may be employed. For example, similar target spectral profiles may be merged into a single spectral profile, and similar confusant spectral profiles may be merged into a single spectral profile. The several merged target spectral profiles and the several merged confusant spectral profiles may be compared to the spectral profile for the background. By this operation, the target and confusant can be separated from background. By this operation, the CSLTM ensures discrimination between the target and the confusant without misclassifying background materials.

Full Spectral Hypercube Reconstruction

One additional aspect of the disclosure is the ability to reconstruct a full hypercube. For example, an image is a set of spectral profiles projected onto basis vectors that result in a set of score images for each basis vector. A conformal image is a set of two or more score images corresponding to two basis vectors, where the basis vectors correspond to transmission spectral profiles associated with the corresponding conformal states. If provided the conformal score images T1 and T2 and the basis vectors, the generation of the full hypercube with one wavelength frame per spectral point is possible.

It should be noted that this process does differ from an actual hypercube because the calculated full hypercube has only the amount of variance from the original full data space that is explained by the two selected basis vectors. In some embodiments, about 10 to about 15 basis vectors are sufficient to explain at least about 99% of the variance of a full hypercube. Still further, generating a full spectral hypercube enables additional operations, including one or more of spectral unmixing or spectral identification.

Adaptive Background Updates

In some embodiments, new sources of confusant spectral profiles are found in the background of the scene by way of the CSLTM of the disclosure. In one such embodiment, a dispersive spectrograph of the scene is collected by illuminating the scene and thereby generating photons that have interacted with the background, target, and previously known confusants. These interacted photons are directed to one or more dispersive spectrometer(s), such as a monochromator. From this, an average spectral profile or a coarse grid of a small number of spectral profiles are collected across the scene.

The collected average spectral profile or the coarse grid of spectral profiles is analyzed. When the targets of interest are spatially small with respect to the size of the scene, the average spectral profile of the entire scene is designated as confusant information by the CSLTM. After designation, any of the average grid spectral profiles that do not overlap with any of the current confusant spectral profiles but which do overlap sufficiently with any of the target spectral profiles can be submitted to the CSLTM algorithm. In certain embodiments, the submission of the target spectral profiles to the CSLTM algorithm is performed in real time or near real time. If any of the average grid spectral profiles do not overlap sufficiently with any of the target spectra, then those spectral profiles are submitted to the CSLTM algorithm and, following submission, a revised T1 and T2 spectral profile is generated. At least one revised T1 and T2 spectral profile is thereby generated.

EXAMPLES

The embodiments of the present teachings described below are not intended to be exhaustive or to limit the teachings to the precise forms disclosed in the following detailed description. Rather, the embodiments are chosen and described so that others skilled in the art may appreciate and understand the principles and practices of the present teachings.

Example 1

A spectral profile was computed for a target. The target and conformal spectral profiles were truncated to the same range, zero-offset and normalized. Each target spectral profile was compared with each conformal spectral profile by CCA to generate a CCA score, which is a unitless number. The CCA scores were subsequently scaled so that they ranged from 0 to 1. It should be noted that the fused score for each conformal spectral profile is such that the highest fused score is associated with the conformal spectral profile and the corresponding voltage state that best detects the set of selected targets, and no weight is given to the effect of the confusants. A fused score is calculated for each of the conformal spectral profiles across each of the target spectral profiles. The fused score uses the formula:

$$\text{Fused Score} = (CCA_1 + CCA_2 + \ldots + CCA_n) \times (CCA_1 \times CCA_2 \times \ldots \times CCA_n)$$

In the formula, each of $CCA_1$, $CCA_2$, and so forth represents a CCA computation for a target spectral profile and a conformal spectral profile. The formula for the fused score includes both addition and multiplication to avoid underweighting or overweighting a single spectral profile. Each fused score is scaled to range from 0 to 1, and the range is inclusive of the endpoints 0 and 1. The resulting fused score for each conformal spectral profile is associated with the conformal spectral profile and the corresponding voltage state that best detects the target, without any consideration of the confusant.

A spectral profile was also computed for a confusant. In this operation, all confusant or spectral profiles and conformal database spectral profiles are truncated to the same range, zero-offset, and vector-normalized. After normalization, the spectral profiles of each confusant are compared by way of CCA to the spectral profiles of each conformal filter. Each confusant spectral profile was compared with each conformal spectral profile by CCA to generate a CCA score, which is a unitless number. The CCA scores were subsequently scaled so that they ranged from 0 to 1. It should be noted that the fused score for each conformal spectral profile is such that the highest fused score is associated with the conformal spectral profile and the corresponding voltage state that best detects the set of selected targets, and no weight is given to the effect of the target. A fused score is calculated for each of the conformal spectral profiles across each of the confusant spectral profiles. The fused score uses the formula:

$$\text{Fused Score} = (CCA_1 + CCA_2 + \ldots + CCA_n) \times (CCA_1 \times CCA_2 \times \ldots \times CCA_n)$$

In the formula, each of $CCA_1$, $CCA_2$, and so forth represents a CCA computation for a confusant spectral profile and a conformal spectral profile. The formula for the fused score includes both addition and multiplication to avoid underweighting or overweighting a single spectral profile. Each fused score is scaled to range from 0 to 1, and the range is inclusive of the endpoints 0 and 1. The resulting fused score for each conformal spectral profile is associated with the conformal spectral profile and the corresponding voltage state that best detects the confusant, without any consideration of the target.

A set of T1 and T2 vectors was additionally calculated. A set of calculations is performed for each of the conformal spectral profiles. These calculations yield the scaled CCA value for a given spectral profile, which is referred to as the "Scaled Target CCA". An orthogonal vector is also determined for each conformal spectral profile, which is then scaled to produce the "Scaled Orthogonal Confusant CCA." The absolute difference between the Scaled Target CCA and the Scaled Orthogonal Confusant CCA is referred to as a "Diff Metric" or "1-diff." Additionally, a "Final Metric" is computed as the product of the Scaled Target CCA multiplied by the Diff Metric.

Based on the Diff Metric, the top ten percent (10%) of the conformal spectral profiles are selected to form Group 1. The top eight (8) members of Group 1 based on the Scaled Target CCA values were selected and the mean and standard deviation of each of the two voltages T1 and T2 were computed, which was assigned to Group 2. Next, Group 3 is formed by including only those entries from Group 1 whose voltages T1 and T2 agree within ±1 standard deviation of the mean of the voltages from Group 2. In this way, Group 3 includes only those voltages that are consistent with the best matches of Groups 1 and 2. The conformal spectral profile of Group 3 with the largest Scaled Target CCA value is designated the top match, and its voltages are outputted as the "Optimal T1/T2 Vector."

The output of the CSLTM is the optimal T1 and T2 pairs of voltage states. When T1 and T2 pairs of voltage states are applied to the particular DPCF in a scene containing the selected targets and confusants for which the CSLTM calculation was performed, the resulting image output has the highest ability to resolve targets that are distinct from the background and any confusants that are present in the scene.

Example 2

Figure 5A:
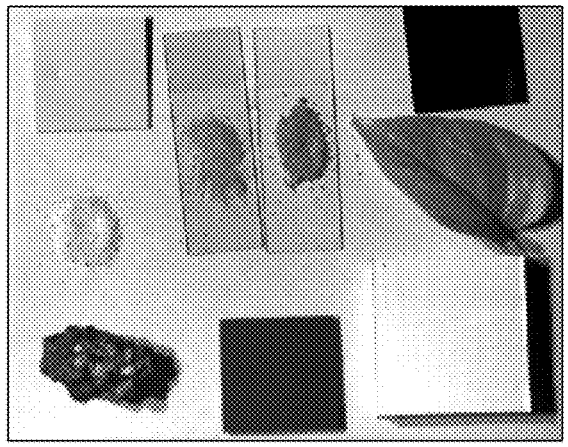
FIGS. 5A and 5B depict conformal images based on the scene of FIG. 3.
Figure 5B:
Figure 6A:
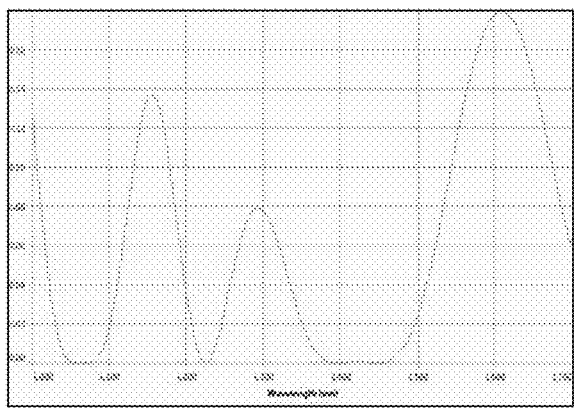
FIG. 6A depicts a plot of the voltage states that correspond to voltage T1 in FIG. 5A.
Figure 6B:
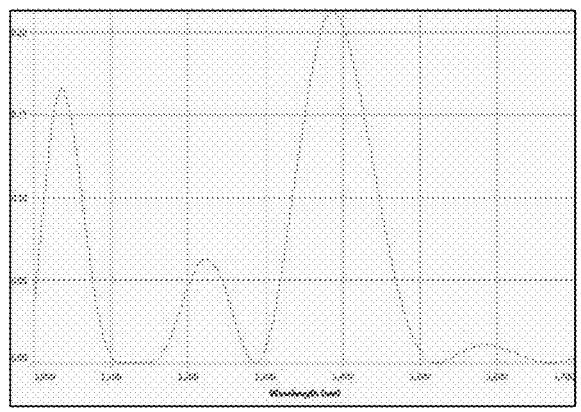
FIG. 6B depicts a plot of the voltage states that correspond to voltage T2 in FIG. 5B.
Figure 7:
FIG. 7 depicts a score image from a calculation of (T2−T1)/(T2+T1) in accordance with an embodiment.

The disclosed CSLTM was tested for the scene profile shown in FIG. 3, where ammonium nitrate and urea are targets, and the vegetation is the confusant. FIG. 5A shows the selected T1 of the conformal spectral profile, and FIG. 5B shows the selected T2 of the conformal spectral profile. FIG. 6A shows the voltage states that correspond to T1 and FIG. 5A, and FIG. 6B shows the voltage states that correspond to T2 and FIG. 5B. FIG. 7 shows a score image from the calculation of $(T2-T1)/(T2+T1)$.

As noted previously, FIG. 4A depicts the spectral profile of ammonium nitrate, and FIG. 4B depicts the spectral profile of urea. The spectral profile of each of the ammonium nitrate and urea are absorbent spectra, and therefore measure the amount of light at a particular wavelength that are absorbed by a sample, thereby forming the spectral profile. In contrast, the spectral profile of the DPCF is a transmittance spectral profile, which is the amount of light that is transmitted by a given DPCF. This means that the T1 is generally negative for most values of the target materials, and T2 is positive for most values of the target material.

Figure 8A:
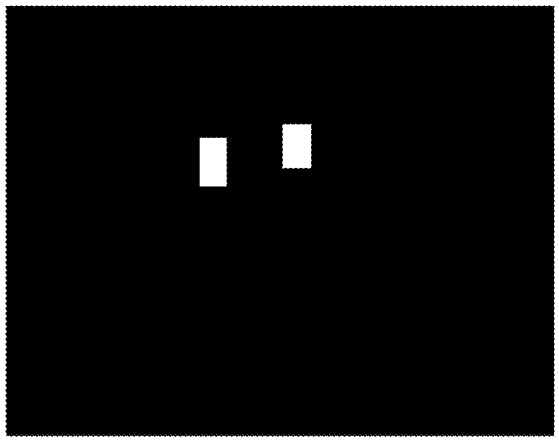
FIG. 8A depicts regions of interest of targets in accordance with an embodiment.
Figure 8B:
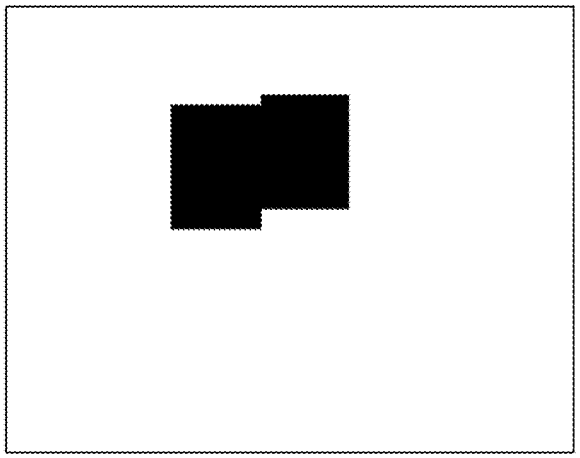
FIG. 8B depicts regions of interest of backgrounds in accordance with an embodiment.
Figure 9A:
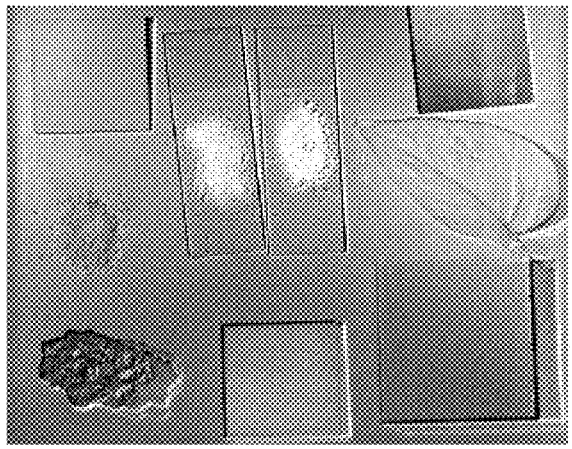
Figure 9B:
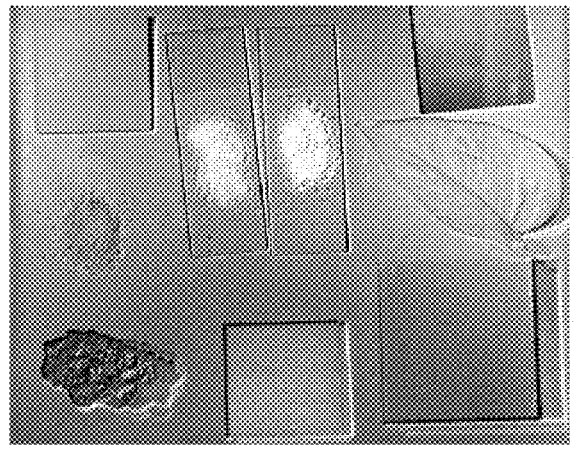
Figure 9C:
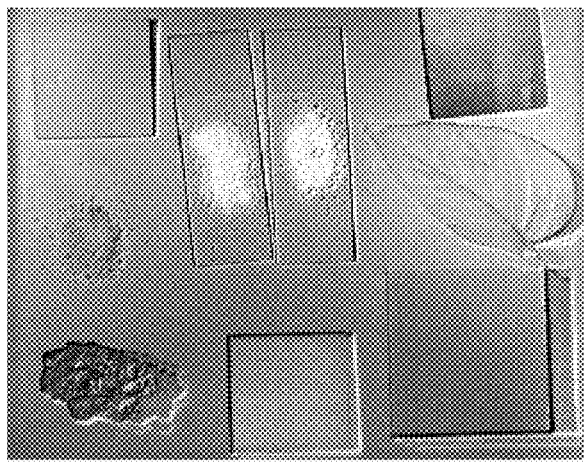
Figure 9D:
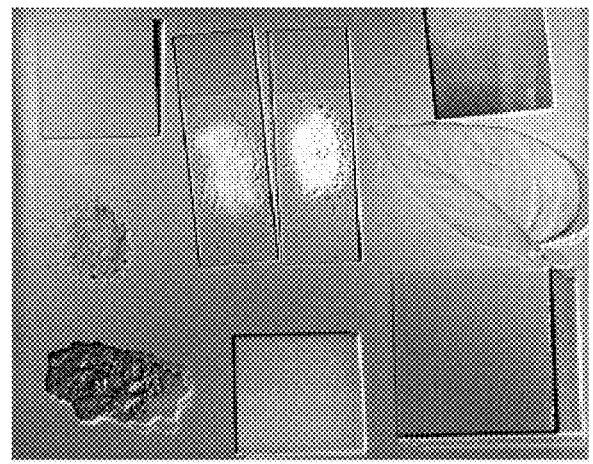
Figure 9E:
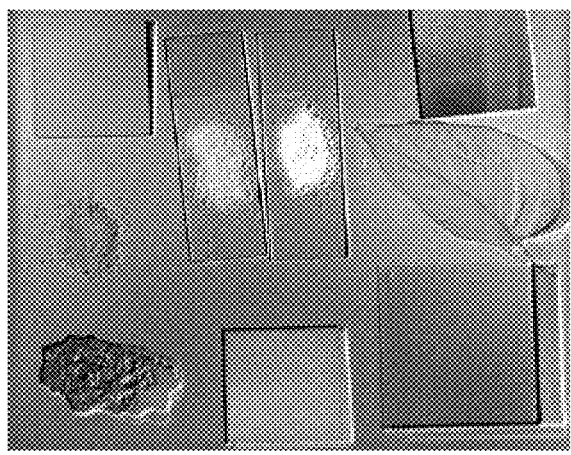
Figure 9F:
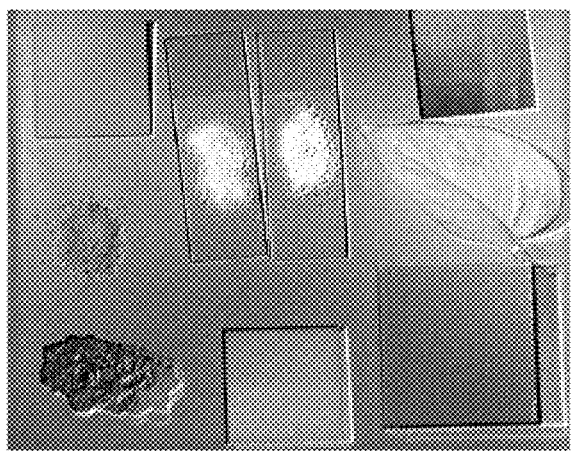

To grade the success of an experiment, the signal-to-noise ratio (SNR) is calculated from the target regions of interest (ROIs) and the background ROIs and the Area Under the ROC Curve (AUROC). FIGS. 8A and 8B show the ROIs that are used. In particular, FIG. 8A depicts the ROI of the target, and FIG. 8B shows the ROI of the background. The SNR value was computed to be 6.259 and the AUROC value is 1.00. The results for this experiment used only a single camera, however additional cameras are contemplated, such as two or more cameras for dual polarization images.

The calculated voltages were determined for 0.11 V step sizes. As a result, the calculated voltages of T1 and T2 are not necessarily available in the conformal voltage hypercube (CVH) and interpolations must be performed to find the closest available conformal images for T1 and T2. Table 1 shows the calculated versus approximated voltages for this experiment. In some cases, the system can collect the conformal images for the calculated waveforms so that the score images do not suffer from approximate voltage states.

TABLE 1

| | Target Voltages | | | CVH Closest Voltage Matches | |
|---|---|---|---|---|---|
| Index | CCA | V1 | V2 | V1 | V2 |
| T1 | 452 | 0.457 | 1.90 | 3.06 | 1.94 | 3.04 |
| T2 | 940 | 0.000 | 2.42 | 2.43 | 2.38 | 2.38 |

A visual review of all 2118 possible score images was performed. FIGS. 9A-9F shows that the top six score images selected visually were also in the list of the top ten results calculated via CSLTM and sorted in ascending order based on the AUC metric. The values for the SNR and AUC are shown in Table 2.

TABLE 2

| Waveform | ID (FIG.) | SNR | AUC |
|---|---|---|---|
| 2109 | 405 | 2.146 | 0.981 |
| 2110 | 406 (FIG. 9C) | 2.146 | 0.981 |
| 2111 | 452 (FIG. 9E) | 2.579 | 0.983 |
| 2112 | 360 | 2.334 | 0.984 |
| 2113 | 436 (FIG. 9D) | 2.334 | 0.984 |
| 2114 | 403 (FIG. 9A) | 2.261 | 0.984 |
| 2115 | 404 (FIG. 9B) | 2.261 | 0.984 |
| 2116 | 453 (FIG. 9F) | 2.481 | 0.985 |
| 2117 | 339 | 2.572 | 0.986 |
| 2118 | 447 | 2.556 | 0.986 |

Example 3

FIGS. 11A-11D show the result of applying CSLTM to the two-camera case and shows the comparison to the prior art data driven optimization methodology—the Conformal Training Software (CFTS) approach. The original (uncorrected) CSLTM results and results in which a left-right camera correction strategy is applied are shown. FIG. 11A shows a scaled score image with correction according to the CSLTM of the disclosure, imaged by two cameras. FIG. 11B shows a scaled score image without correction according to the CSLTM of the disclosure, imaged by two cameras. FIG. 11C a scaled score image without correction according to the CSLTM of the disclosure, obtained from an optical apparatus having a single camera. Finally, FIG. 11D depicts a scaled score image obtained using the prior art CFTS approach, imaged by two cameras. The signal to noise ratio (SNR) of the corrected CSLTM results are comparable to the CFTS results (SNR of 3.062 vs 3.329). The CFTS results use the precise voltage stages requested by the method. The remaining performance gap of CSLTM with CFTS is likely to be mitigated when the CSLTM method is tested with exact voltage waveforms rather than approximated waveforms. Corresponding SNR data appears in Table 3.

TABLE 3

| Experiment Description | SNR (one-camera) | SNR (two-camera) | Max Possible SNR |
|---|---|---|---|
| AN & Urea vs Leaf (original) | 6.259 | 2.579 | 6.259 |
| AN & Urea vs Leaf (corrected) | NA | 3.062 | 6.259 |
| AN & Urea vs Leaf (CFTS) | 2.818 | 3.329 | 10.660 |

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method of determining voltage values T1 and T2 for a scene profile of a scene comprising:
characterizing an optical filter and forming an optical filter database;
characterizing the scene profile of the scene and forming a scene profile database;
fusing the spectral profiles of at least one target with the spectral profile of an optical filter database, said fusing including;
  truncating, zero-offsetting, and vector-normalizing the spectral profiles of the target and the optical filter database spectral profiles;
  comparing by cosine correlation analysis (CCA) each spectral profile of the target with each optical filter database spectral profile to output an array of target CCA values,
  scaling each target CCA value in the array to a value of 0 to 1; and
  generating a target fused score from each scaled target CCA value;
fusing the spectral profiles of at least one confusant with the spectral profile of an optical filter database, said fusing including:
  truncating, zero-offsetting, and vector-normalizing the spectral profiles of at least one confusant and the optical filter database spectral profiles;
  comparing by CCA each spectral profile of at least one confusant with each optical filter database spectral profile to output an array of confusant CCA values;
  scaling each confusant CCA value in the array to a value of 0 to 1; and
  generating a confusant fused score from each scaled confusant CCA value;
determining T1 and T2 for application to the optical filter for the scene profile, said determining including:
  computing a differential metric score that is the absolute difference between each scaled target CCA score and each scaled confusant CCA score;
  selecting voltages T1 and T2 that correspond with the highest 10% of values of differential metric score; and
outputting voltage values T1 and T2 as one or more of a value in a computer readable medium or as voltages that are applied to at least one optical filter.

2. The method of claim 1, further comprising calculating a full hypercube on the basis of T1 and T2 and at least one basis vector.

3. The method of claim 1, wherein characterizing the optical filter and forming an optical filter database comprises:
   applying a first series of voltages to a first liquid crystal stage of the optical filter, wherein the first series of voltages includes more than one different voltage that causes an optical response from the first liquid crystal stage of the optical filter;
   applying a second series of voltages to a second liquid crystal stage of the optical filter, wherein the second series of voltages includes more than one different voltage that causes an optical response from the second liquid crystal stage of the optical filter;
   determining, at a time that at least overlaps the application of the first series of voltages and the second series of voltages, an optical transmittance of light through the optical filter within a pre-selected range of wavelengths of the light;
   recording, on a computer readable medium, database entries including the first series of voltages, the second series of voltages, and the optical transmittances of light through the optical filter corresponding to the application of the first series of voltages and the second series of voltages, wherein each database entry is a spectral profile of the optical filter;
   comparing each spectral profile of the optical filter with each other spectral profile of the optical filter to thereby determine those spectral profiles that are most dissimilar to each other; and
   designating those spectral profiles that are most dissimilar to each other as orthogonal database pairs to form an optical filter database.

4. The method of claim 1, wherein characterizing the scene profile of the scene and forming a scene profile database comprises:
   generating a spectral profile of a background that is present in the scene;
   recording, on a computer readable medium, the spectral profile of the background that is present in the scene;
   generating a spectral profile of at least one target that is present in the scene;
   recording, on a computer readable medium, the spectral profile of the at least one target that is present in the scene;
   comparing the spectral profile of the at least one target with the spectral profile of the background;
   recording, in a scene profile database in a computer readable medium, only the spectral profiles of those targets and the background that overlap.

5. A method of characterizing an optical filter and forming an optical filter database comprising:
   applying a first series of voltages to a first liquid crystal stage of the optical filter, wherein the first series of voltages includes more than one different voltage that causes an optical response from the first liquid crystal stage of the optical filter;
   applying a second series of voltages to a second liquid crystal stage of the optical filter, wherein the second series of voltages includes more than one different voltage that causes an optical response from the second liquid crystal stage of the optical filter;
   determining, at a time that at least overlaps the application of the first series of voltages and the second series of voltages, an optical transmittance of light through the optical filter within a pre-selected range of wavelengths of the light;
   recording, on a computer readable medium, database entries including the first series of voltages, the second series of voltages, and the optical transmittances of light through the optical filter corresponding to the application of the first series of voltages and the second series of voltages, wherein each database entry is a spectral profile of the optical filter;
   comparing each spectral profile of the optical filter with each other spectral profile of the optical filter to thereby determine those spectral profiles that are most dissimilar to each other; and
   designating those spectral profiles that are most dissimilar to each other as orthogonal database pairs to form an optical filter database.

6. The method of claim 5, wherein comparing each spectral profile of the optical filter with each other spectral profile of the optical filter is performed by cosine correlation analysis (CCA).

7. A method of characterizing a scene profile for a scene and forming a scene profile database comprising:
   generating a spectral profile of a background that is present in the scene;
   recording, on a computer readable medium, the spectral profile of the background that is present in the scene;
   generating a spectral profile of at least one target that is present in the scene;
   recording, on a computer readable medium, the spectral profile of the at least one target that is present in the scene;
   comparing the spectral profile of the at least one target with the spectral profile of the background;
   recording, in a scene profile database in a computer readable medium, only the spectral profiles of those targets and the background that overlap.

8. The method of claim 7, wherein the scene further includes at least one confusant.

9. The method of claim 8, further comprising:
   generating a spectral profile of the at least one confusant;
   comparing the spectral profile of at least one confusant with the spectral profile of the background, and
   recording, in a scene profile database in a computer readable medium, only the spectral profiles of those confusants and the background that overlap.

10. The method of claim 7, wherein each step of comparing is performed by cosine correlation analysis (CCA).

* * * * *